US012517597B2

(12) United States Patent
Ju et al.

(10) Patent No.: US 12,517,597 B2
(45) Date of Patent: Jan. 6, 2026

(54) MAGNETIC DAMPING TOP-SPEED OPTICAL WHEEL

(71) Applicant: SHENZHEN LOYAL ELECTRONICS CO., LTD., Guangdong (CN)

(72) Inventors: Qiaolong Ju, Shenzhen (CN); Quan Jiang, Shenzhen (CN)

(73) Assignee: SHENZHEN LOYAL ELECTRONICS CO., LTD., Shenzhen (CN)

(*) Notice: Subject to any disclaimer, the term of this patent is extended or adjusted under 35 U.S.C. 154(b) by 0 days.

(21) Appl. No.: 18/756,531

(22) Filed: Jun. 27, 2024

(65) Prior Publication Data

US 2024/0345670 A1 Oct. 17, 2024

Related U.S. Application Data

(63) Continuation-in-part of application No. PCT/CN2023/107546, filed on Jul. 14, 2023.

(30) Foreign Application Priority Data

Nov. 16, 2022 (CN) ........................ 202211436605.6

(51) Int. Cl.
*G06F 3/0362* (2013.01)

(52) U.S. Cl.
CPC .................................. *G06F 3/0362* (2013.01)

(58) Field of Classification Search
CPC ..................................................... G06F 3/0362
See application file for complete search history.

(56) References Cited

U.S. PATENT DOCUMENTS

2009/0195519 A1* 8/2009 Chou .................... G06F 3/0338 345/184
2021/0096663 A1 4/2021 Cheung et al.
2021/0318761 A1* 10/2021 Dunant ................... G06F 3/038
(Continued)

FOREIGN PATENT DOCUMENTS

CN 102929413 A 2/2013
CN 103455173 A 12/2013
CN 108021250 A 5/2018
(Continued)

OTHER PUBLICATIONS

International Search Report issued on Sep. 27, 2023, in corresponding International Patent Application No. PCT/CN2023/107546, 8 pages.

*Primary Examiner* — Hang Lin
(74) *Attorney, Agent, or Firm* — Maier & Maier, PLLC

(57) ABSTRACT

A magnetic damping top-speed optical wheel which includes a PCBA board; a middle button, a right swing button, and a left swing button are arranged on the PCBA board; a bracket is arranged on a surface of the PCBA board; an optical sensing assembly is arranged inside the bracket and electrically connected with the PCBA board. A pressing portion is arranged on the bracket between the left swing button and the right swing button. The pressing portion is parallel to the left swing button and the right swing button, such that vertically pressing the wheel would only trigger the middle button but the left swing button or the right swing button.

16 Claims, 7 Drawing Sheets

(56) References Cited

U.S. PATENT DOCUMENTS

2022/0011884 A1* 1/2022 Dou ...................... G06F 3/0362

FOREIGN PATENT DOCUMENTS

| | | | |
|---|---|---|---|
| CN | 110618758 | A | 12/2019 |
| CN | 112987952 | A | 6/2021 |
| CN | 113589959 | A | 11/2021 |
| CN | 217238770 | U | 8/2022 |
| CN | 116225246 | A | 6/2023 |
| CN | 219370317 | U | 7/2023 |
| JP | 2006189950 | A | 7/2006 |

* cited by examiner

| Clockwise movement | Counterclockwise movement |
|---|---|
| AB | AB |
| 00 | 00 |
| 01 | 10 |
| 11 | 11 |
| 10 | 01 |
| 00 | 00 |

MAGNETIC DAMPING TOP-SPEED OPTICAL WHEEL

CROSS-REFERENCE TO RELATED APPLICATIONS

The present disclosure is a Bypass Continuation Application of PCT Patent Application No. PCT/CN2023/107546, filed on Jul. 14, 2023, which claims priority to Chinese Patent Application No. 202211436605.6, filed on Nov. 16, 2022. The content of all aforesaid applications is incorporated herein by reference.

FIELD

The present disclosure relates to the technical field of a mouse, in particular to a magnetic damping top-speed optical wheel.

BACKGROUND

Mouse is an external input device of computer, and also an indicator of vertical and horizontal coordinate positioning of computer display system, so it is named because it looks like a mouse. Its standard name should be "mouse instrument". The use of the mouse is to make the operation of the computer easier and faster, to replace the tedious instructions of the keyboard. The mouse with light wheel has infrared light source, high resolution and refresh frequency, and has the advantages of flexibility and accuracy in operation.

In the prior art, some wheels using mechanical encoders rely on the encoder itself to scroll in increments, and a plastic plane gear is arranged inside the encoder, and the grating wheels rely on a small iron wire in the wheel to scrape the grating to provide a sense of scrolling in increments, but this mechanically coded sense of scrolling in increments is too mechanical in operation, lacks smoothness, and affects the hand feeling.

SUMMARY

Technical Problems to be Solved

According to the above-mentioned defect of the prior art, the purpose of the present disclosure is to provide a magnetic damping top-speed optical wheel to solve the problem that mechanical coded paragraph sense is too mechanical and not smooth enough, and affects hand feel and the life.

Further, the present disclosure solves the problem that pressing the wheel could not trigger the middle button, the left swing button and the right swing button correctly.

Technical Scheme

To achieve the above purpose, the present disclosure is realized by the following technical schemes: a magnetic damping top-speed optical wheel comprises a PCBA board; a middle button, a left swing button, and a right swing button are arranged on the PCBA board; a bracket is arranged on a surface of the PCBA board through a PCB board; and an optical sensing assembly is arranged inside the bracket and electrically connected with the PCBA board.

A magnetic inner shaft is arranged inside the bracket by a metal shaft; a uniform array of first magnetic teeth is arranged on a surface of the magnetic inner shaft; a magnetic outer shaft is nested to the surface of the magnetic inner shaft; a surface of the metal shaft is movably connected to an inner side wall of the magnetic inner shaft; second magnetic teeth corresponding to the first magnetic teeth are arranged inside the magnetic outer shaft; a shaft sleeve is arranged on a surface of the magnetic outer shaft.

Furthermore, one end of the metal shaft is inserted into an inner side wall of the bracket for connection; the metal shaft and the magnetic inner shaft are integral injection molding; a fixture block is integrally formed on one side of the magnetic inner shaft; a fixture slot is arranged on a surface of the bracket; a surface of the fixture block is movably connected to an interior side of the fixture slot.

Furthermore, an inner wall of the shaft sleeve is symmetrically arranged with limit blocks; the surface of the magnetic outer shaft is symmetrically arranged with two groups of limit portions; the limit portion comprises two limit pieces; the two limit pieces of each group are respectively movably connected to two of the limit blocks; a limit rubber ring is arranged between the magnetic outer shaft and the shaft sleeve; a leather ring is arranged on a surface of the shaft sleeve.

Furthermore, an inner side wall of a surface of the limit rubber ring is connected with the surface of the magnetic outer shaft; an outer side wall of the limit rubber ring is connected with an inner side wall of the shaft sleeve; the surface of the limit rubber ring is arranged with a slot; and an inner side wall of the slot is movably connected with a surface of the limit blocks.

Furthermore, a limit groove is arranged on the surface of the shaft sleeve; a fixed portion is arranged on the surface of the limit rubber ring by integral molding; a surface of the fixed portion is movably connected with an inner side wall of the limit groove.

Furthermore, an upper portion of the PCBA board is electrically connected with a left swing button and a right swing button; the surface of the bracket is integrally formed with a pressing portion; the pressing portion is arranged between the left swing button and the right swing button.

Furthermore, the optical sensing assembly comprises an optical receiver and an optical transmitter; both the optical receiver and the optical transmitter are arranged inside the bracket; a uniform array of light holes is arranged on the surface of the magnetic outer shaft.

Furthermore, a uniform array of light holes is arranged on the surface of the magnetic outer shaft, and each light hole corresponds to a notch of the second magnetic teeth.

Furthermore, a number ratio between the light holes and the notches of the second magnetic teeth is 1:2, an interval between every two light holes corresponds to one notch of the second magnetic teeth.

In another implementation, the magnetic damping top-speed optical wheel comprises a PCBA board; a middle button, a left swing button, and a right swing button are arranged on the PCBA board; a bracket is arranged on a surface of the PCBA board directly; and an optical sensing assembly is arranged inside the bracket and electrically connected with the PCBA board.

Beneficial Effects

The present disclosure has the following beneficial effects:

(1) The magnetic damping top-speed optical wheel is arranged with a metal shaft, a magnetic inner shaft, a magnetic outer shaft, first magnetic teeth, and second magnetic teeth. In the process of the shaft sleeve drives the magnetic outer shaft to rotate, when the first magnetic teeth and the second magnetic teeth correspond to each other, an attraction between the two is the strongest; when the first magnetic teeth and the second magnetic teeth are staggering, the attraction is gradually weakened. Thus, a paragraph sense of the optical wheel is generated with the changes of attraction. Compared with a mechanical encoders wheel of the prior art, the magnetic damping top-speed optical wheel of the present disclosure is smooth enough, has good hand feeling, long life effect, and does not wear the internal portions.

(2) The magnetic damping top-speed optical wheel is arranged with a shaft sleeve and a leather ring for increasing friction force to facilitate the shaft sleeve rotation. When the shaft sleeve is forced to rotate rapidly, the external force overcomes the attraction between the first magnetic teeth and the second magnetic teeth 9, and under the action of inertia, the shaft sleeve 10 continues to rotate; Furthermore, the attraction between the first magnetic teeth 7 and the second magnetic teeth 9 assists the shaft sleeve 10 to continue to rotate after losing the external force, so that the shaft sleeve 10 can drive the magnetic outer shaft 8 to rotate continuously to realize top-speed function and browse the web pages quickly and conveniently.

(3) The pressing portion is arranged between the left swing button and the right swing button and is parallel to the left swing button and the right swing button. Therefore, vertically pressing the wheel would only trigger the middle button, and only pressing the wheel with a lateral force could trigger the left swing button or the right swing button, false trigger of different buttons is eliminated.

Of course, any embodiment of the present disclosure does not necessarily achieve all the advantages described above.

DETAILED DESCRIPTION OF EMBODIMENTS

Figure 1:
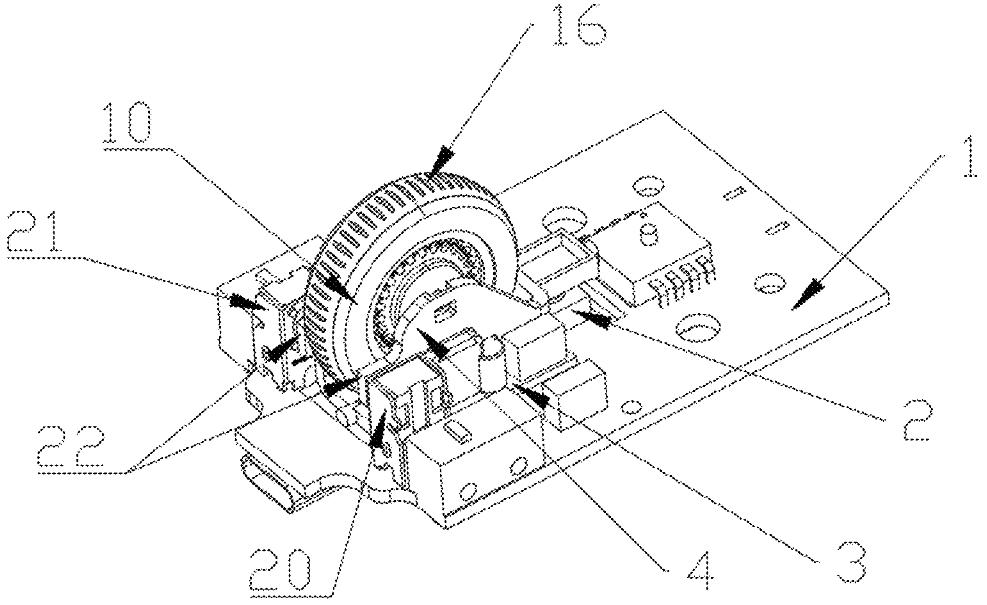
FIG. 1 is a schematic structural diagram of the present disclosure.
Figure 2:
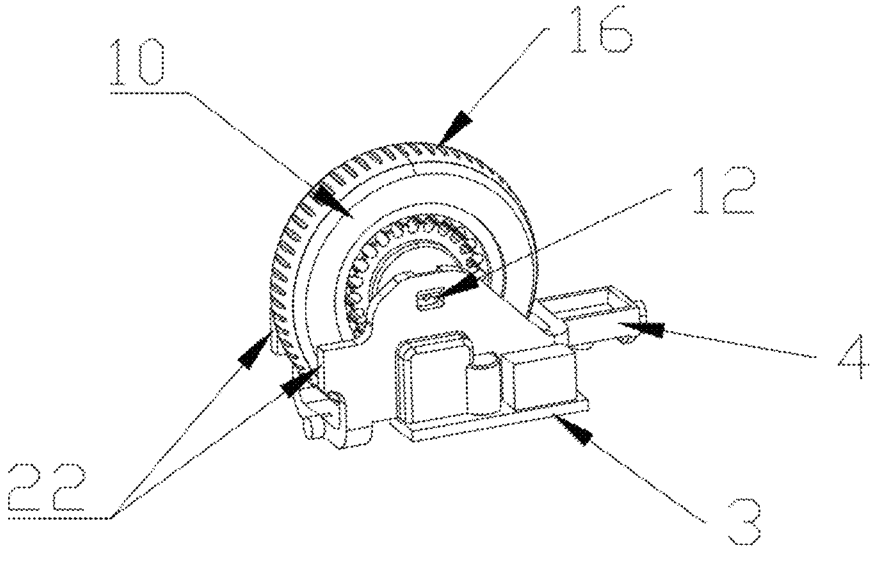
FIG. 2 is a schematic structural diagram of a pressing portion of the present disclosure.
Figure 3:
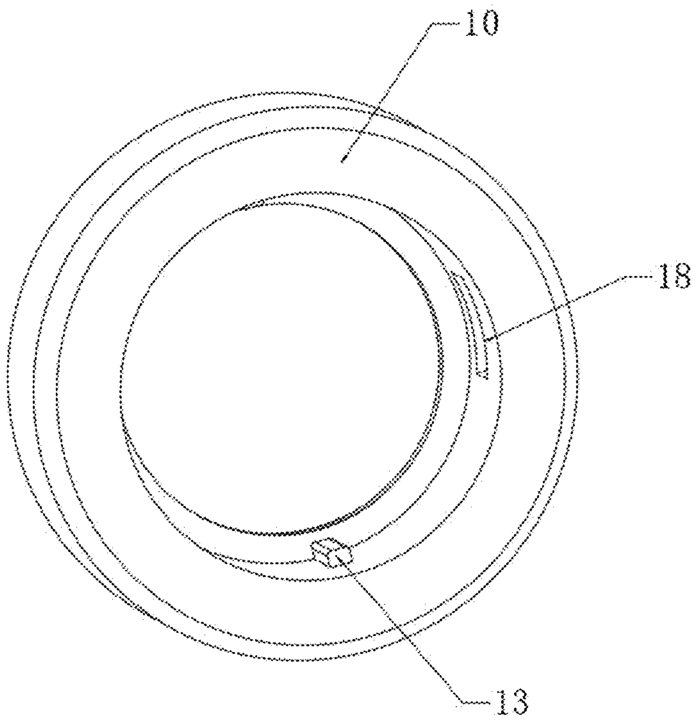
FIG. 3 is a schematic structural diagram of the present disclosure.
Figure 4:
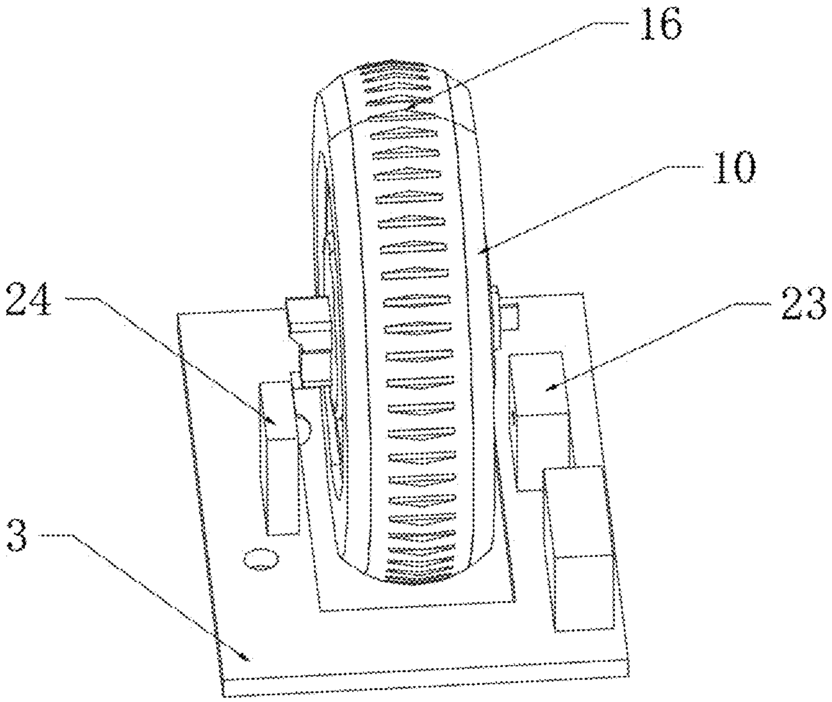
FIG. 4 is a schematic structural diagram of an optical transmitter of the present disclosure.
Figure 5:
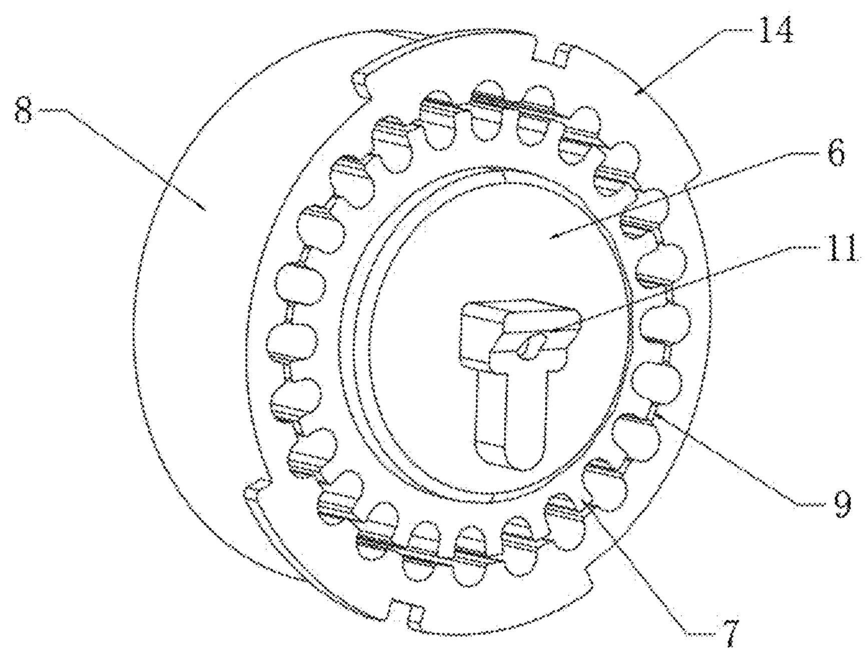
FIG. 5 is a schematic structural diagram of a fixture block of the present disclosure.
Figure 6:
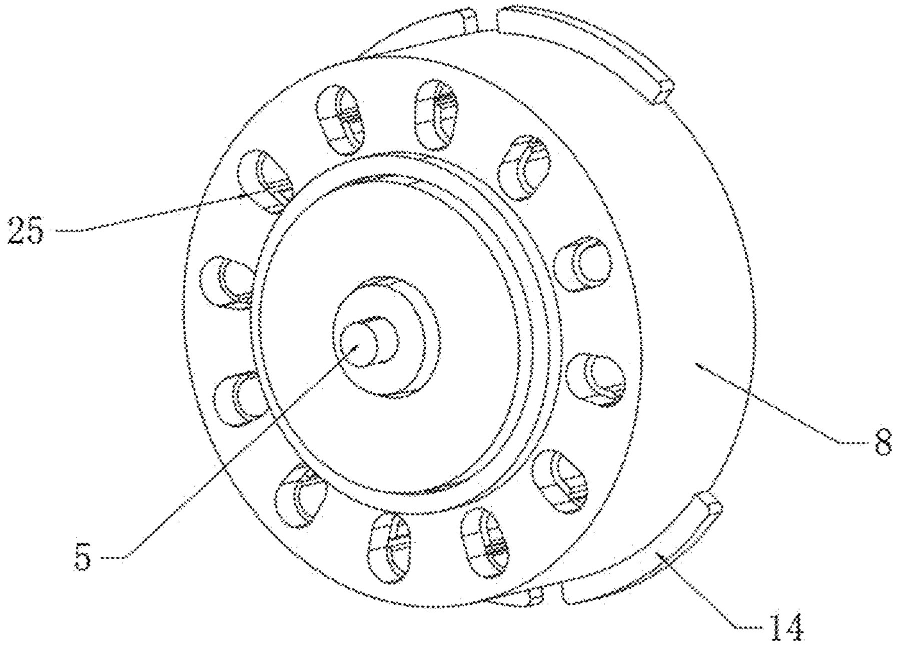
FIG. 6 is a schematic structural diagram of light holes of the present disclosure.
Figure 7:
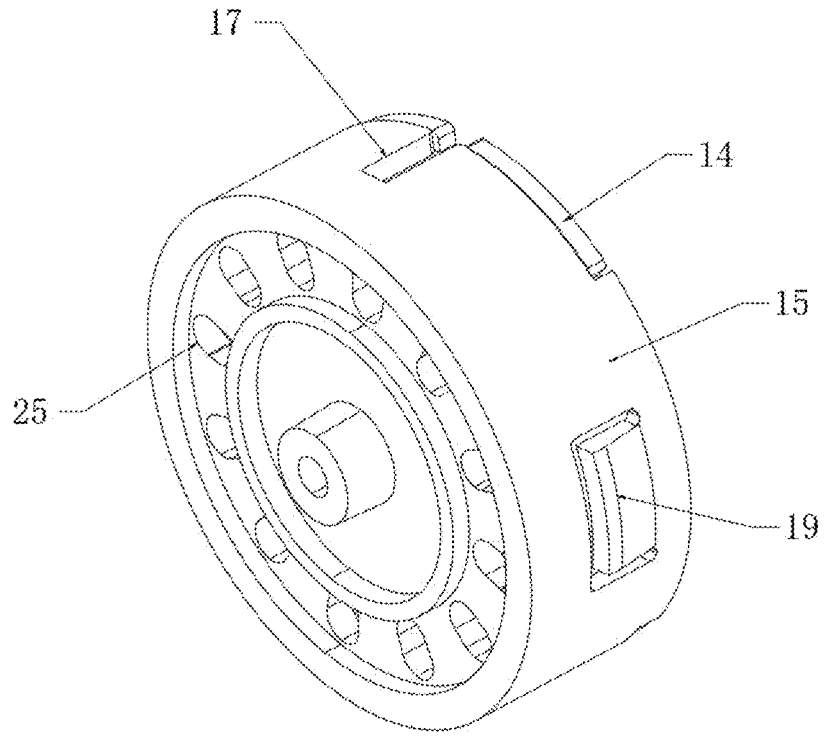
FIG. 7 is a schematic structural diagram of a fixed portion of the present disclosure.
Figure 8:
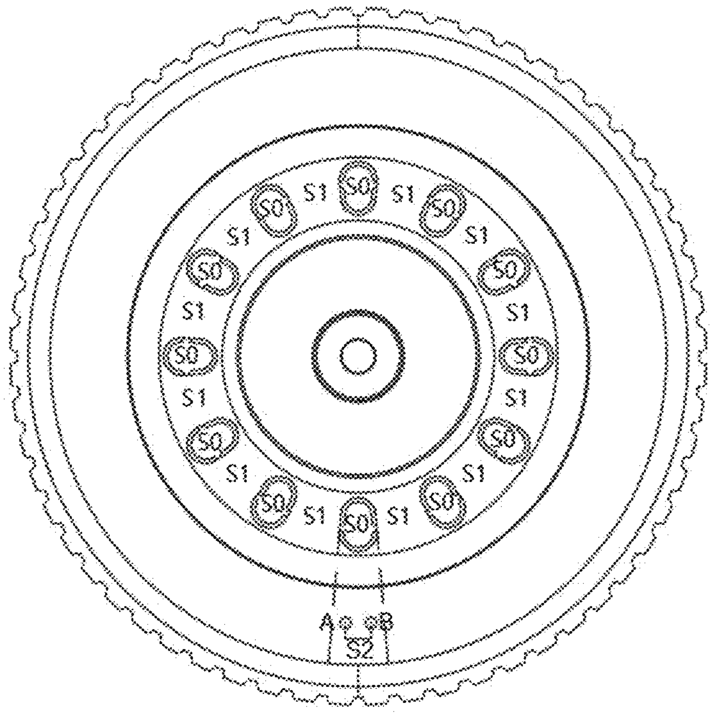
FIG. 8 is a schematic structural diagram of a magnetic outer shaft of the present disclosure.

In order to make someone of ordinary skill in the field better understand the technical scheme, the technical scheme of the present disclosure will be clearly and completely described in combination with the attached drawings in the exemplary embodiment. Obviously, the described exemplary embodiments are only a part of exemplary embodiments, not whole embodiments. Based on the embodiments, all other embodiments obtained by those skilled in the art with no inventive labor should fall within the protection scope of the appended claims of the present disclosure.

It should be understood that, in the description of the present disclosure, the terms "opening", "up", "down", "thickness", "top", "middle", "length", "inside", "four" indicate the orientation or position relationship, only to facilitate the description of the present disclosure and simplify the description, rather than indicating or implying that the component or element must be constructed and operated in a specific orientation, and therefore cannot be understood as a limitation of the present disclosure.

As shown in FIGS. 1-10, a magnetic damping top-speed optical wheel is provided in one exemplary embodiment of the present disclosure, the magnetic damping top-speed optical wheel includes a PCBA board 1, a middle button 2 arranged on the PCBA board 1, a bracket 4 arranged on a surface of the PCBA board 1 through a PCB board 3, and an optical sensing assembly electrically connected to the PCBA board 1; the optical sensing assembly is arranged inside the bracket 4.

By a metal shaft 5, a magnetic inner shaft 6 is arranged inside the bracket 4; a uniform array of first magnetic teeth 7 is arranged on a surface of the magnetic inner shaft 6; a magnetic outer shaft 8 is nested to the surface of the magnetic inner shaft 6; a surface of the metal shaft 5 is movably connected to an inner side wall of the magnetic inner shaft 6; second magnetic teeth 9 corresponding to the first magnetic teeth 7 are arranged inside the magnetic outer shaft 8; a shaft sleeve 10 is arranged on a surface of the magnetic outer shaft 8.

Both the magnetic inner shaft 6 and the magnetic outer shaft 8 have magnetic fields. The first magnetic teeth 7 on the magnetic inner shaft 6 are raised in a direction of the magnetic outer shaft 8, the second magnetic teeth 9 on the inner wall of the magnetic outer shaft 8 are raised in a direction of the magnetic inner shaft 6. Both first magnetic teeth 7 and second magnetic teeth 9 are uniform array arranged and arranged one-to-one correspondence of natural state. In the process of the shaft sleeve 10 drives the magnetic outer shaft 8 to rotate, when the first magnetic teeth 7 and the second magnetic teeth 9 correspond to each other, an attraction between the two is the strongest; when the first magnetic teeth 7 and the second magnetic teeth 9 are staggering, the attraction is gradually weakened. Thus, a paragraph sense is generated when in use. Because there is no mechanical contact between the first magnetic teeth 7 and the second magnetic teeth 9, the paragraph sense is completely generated by the attraction between them, so the magnetic damping top-speed optical wheel has higher smoothness and lower mechanical sense than a mechanical encoder.

Specifically, one end of the metal shaft 5 is inserted into an inner side wall of the bracket 4 for connection; the metal shaft 5 and the magnetic inner shaft 6 are integral injection molding; a fixture block 11 is integrally formed on one side of the magnetic inner shaft 6; a fixture slot 12 is arranged on a surface of the bracket 4; a surface of the fixture block 11 is movably connected to an interior side of the fixture slot 12.

In one embodiment, the metal shaft 5 and the magnetic inner shaft 6 are integral injection molding; the metal shaft 5 is docked with a circular groove on an inner wall of the bracket 4; the fixture block 11 on the magnetic inner shaft 6 is arranged with an inclined plane. When installation, it is only necessary to press the inclined plane of the fixture block 11 against the surface of the bracket 4. Under the action of the inclined plane, the fixture block 11 enters an interior of the fixture slot 12, thus fixing the magnetic inner shaft 6 and preventing rotation.

Specifically, an inner wall of the shaft sleeve 10 is symmetrically arranged with limit blocks 13; the surface of the magnetic outer shaft 8 is symmetrical arranged with two groups of limit portions; the limit portion includes two limit pieces 14; the two limit pieces 14 of each group are respectively movably connected to the two limit blocks 13; a limit rubber ring 15 is arranged between the magnetic outer shaft 8 and the shaft sleeve 10; a leather ring 16 is arranged on a surface of the shaft sleeve 10.

In one embodiment, when mounting the shaft sleeve 10 with the magnetic outer shaft 8, the metal shaft 5 and the magnetic inner shaft 6 are integral injection molding, and the metal shaft 5 is movably and rotatably connected to the magnetic outer shaft 8. Then the magnetic outer shaft 8 is inserted into the shaft sleeve 10 so that a gap between the two adjacent limit pieces 14 corresponds to the position of the limit blocks 13. Optionally, the magnetic outer shaft 8 is inserted into the shaft sleeve 10 and is restricted by the limit blocks 13 and the limit pieces 14. Then the limit rubber ring 15 is arranged between the magnetic outer shaft 8 and the shaft sleeve 10 for limiting the magnetic outer shaft 8 and preventing the magnetic outer shaft 8 from shedding.

Specifically, an inner side wall of a surface of the limit rubber ring 15 is connected with the surface of the magnetic outer shaft 8; an outer side wall of the limit rubber ring 15 is connected with an inner side wall of the shaft sleeve 10; the surface of the limit rubber ring 15 is arranged with a slot opening 17; and an inner side wall of the slot opening 17 is movably connected with a surface of the limit blocks 13.

A limit groove 18 is arranged on the surface of the shaft sleeve 10; a fixed portion 19 is arranged on the surface of the limit rubber ring 15 by integral molding; a surface of the fixed portion 19 is movably connected with an inner side wall of the limit groove 18.

In one embodiment, a slot opening 17 matched with the limit blocks 13 is arranged on the limit rubber ring 15. The limit rubber ring 15 is rubber material and filled between the magnetic outer shaft 8 and shaft sleeve 10 to generate large friction force, which can make the connection between the shaft sleeve 10 and the magnetic outer shaft 8 more compact and prevent sliding. Furthermore, the limit rubber ring 15 is integrally formed with a fixed portion 19, and the fixed portion 19 bulges outward and extends into the limit groove 18 on the shaft sleeve 10, so that the connection strength between the limit rubber ring 15 and the shaft sleeve 10 can be further increased, thereby preventing falling off.

Specifically, an upper portion of the PCBA board 1 is electrically connected with a left swing button 20 and a right swing button 21; the surface of the bracket 4 is integrally formed with a pressing portion 22; the pressing portion 22 is arranged between the left swing button 20 and the right swing button 21. As shown in FIG. 1, the pressing portion 22 is arranged between the left swing button 20 and the right swing button 21 in a vertically direction. Therefore, the pressing portion 22 is parallel to the left swing button 20 and the right swing button 21. When vertically pressing the wheel, the pressing portion 22 moves vertically and would not touch the left swing button 20 or the right swing button 21, only the middle button is triggered. And when pressing the wheel with a lateral force, the pressing portion 22 could press the left swing button 20 or the right swing button 21 according to the direction of the force to trigger the left swing button 20 or the right swing button 21. Thus, false trigger is eliminated when pressing the wheel.

In one embodiment, a ring groove is arranged on the bracket 4, a support corresponding to the ring groove is arranged on a mouse shell (not shown in drawings). The bracket 4 swings when rotating the shaft sleeve 10 around a joint of the support and the ring groove by external force, so that the left swing button 20 or the right swing button 21 can be pressed by the pressing portion 22 integrally formed on the surface of the bracket 4, and if the external force is a vertical force, the bracket 4 moves downwards vertically, so that the pressing portion 22 would not press the left swing button 20 or the right swing button 21, and only the middle button 2 can be pressed, false trigger of the middle button 2, the left swing button 20 and the right swing button 21 is eliminated, thereby realizing multi-functions, making the mouse more functional and being convenient to be applied to different scenarios.

Specifically, the optical sensing assembly includes an optical receiver 23 and an optical transmitter 24; both the optical receiver 23 and the optical transmitter 24 are arranged inside the bracket 4; a uniform array of light holes 25 are arranged on the surface of the magnetic outer shaft 8.

In one embodiment, optical signals emitted by the optical transmitter 24 can be received by the optical receiver 23, and the optical signals can only be received by the optical receiver 23 when passing through the light holes 25 on the magnetic outer shaft 8. A rotation of the shaft sleeve 10 can be judged by detecting the spaced optical signals to realize the effect of browsing the web page.

Figure 11:
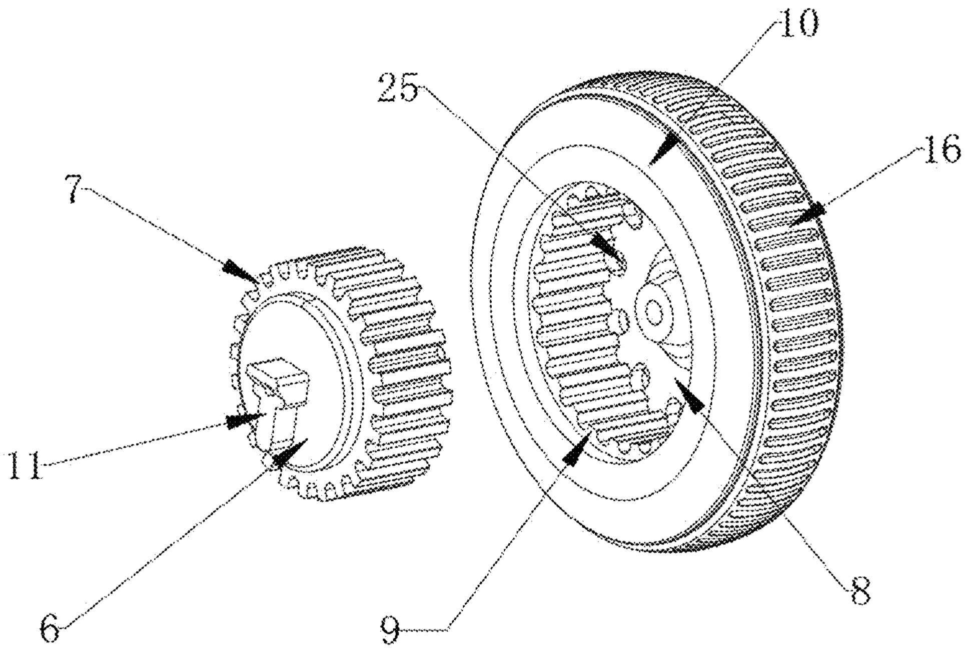
FIG. 11 is a schematic diagram of the positional relationship between the magnetic inner shaft and the magnetic outer shaft of the present disclosure.
Figure 12:
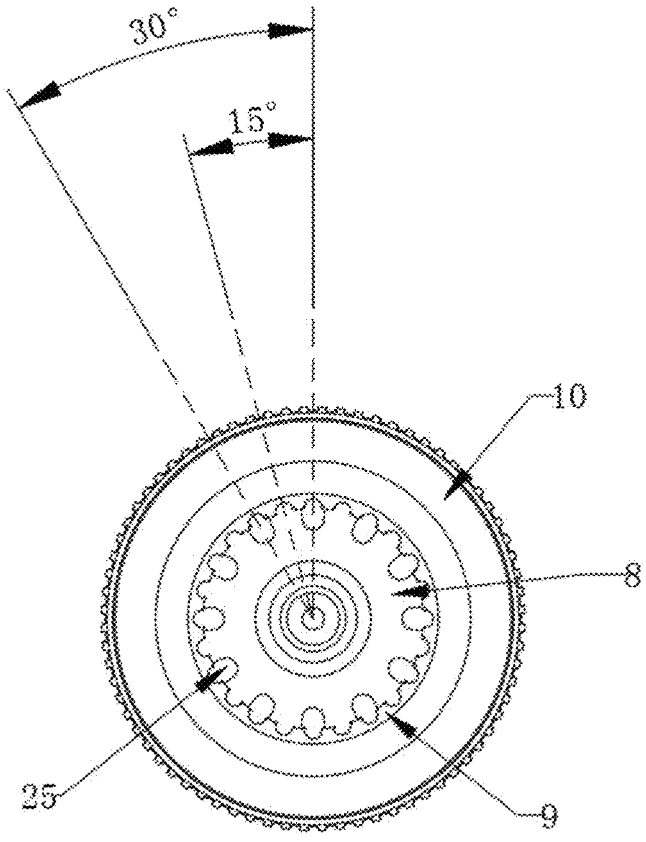
FIG. 12 is a schematic diagram of the side of the magnetic outer shaft corresponding to the magnetic inner shaft of the present disclosure.

Further, the light holes 25 are arranged to be corresponded to notches of the second magnetic. When each notch of the second magnetic teeth 9 and is corresponded to each notch of the first magnetic teeth 7 of the magnetic inner shaft, optical signals emitted by the optical transmitter 24 pass through the space formed between a notch of the second magnetic teeth 9 and a notch of the first magnetic teeth 7, then pass through a light hole 25 and are received by the optical receiver 23. While the magnetic outer shaft 8 is rotated, the second magnetic teeth 9 and the first magnetic teeth 7 form a correspondence state and an offset state, alternatively, the optical signals pass through the light holes 25 are spaced, the shaft sleeve 10 is detected to be rotated, thus the effect of browsing the web page is realized. Further, as shown in FIG. 11 and FIG. 12, a number ratio between the light holes 25 and the second magnetic teeth 9 is 1:2, and the interval between two light holes 25 corresponds to a notch of the second magnetic teeth 9. In one embodiment, twelve light holes 25 are arranged on the magnetic outer shaft 8, and each two adjacent light holes 25 are separated by a central angle of 30 degrees. In the present embodiment, the magnetic outer shaft 8 has twenty-four inner teeth protruding inwards to form the second magnetic teeth 9, twenty-four notches are arranged in the second magnetic teeth 9, and each two adjacent notches are separated by a central angle of 15 degrees; the magnetic inner shaft 6 has twenty-four outer teeth protruding outwards on the surface to form the first magnetic teeth 7, and twenty-four notches are arranged in the first magnetic teeth 7, and the notches of the first magnetic teeth 7 are corresponded to the notches of the second magnetic teeth 9 one-by-one. When the magnetic outer shaft 8 is rotated driven by the shaft sleeve 10, the notches of the first magnetic teeth 7 and the notches of the second magnetic teeth 9 form a correspondence state and an offset state to space the optical signals.

Figures 9, 10:
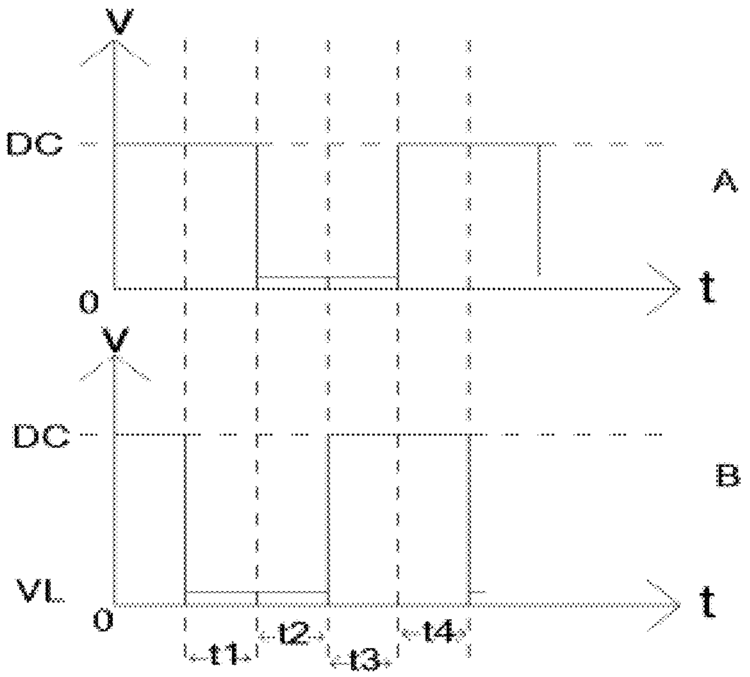
FIG. 9 is a waveform schematic diagram of pulse output signal of the present disclosure.
FIG. 10 is a schematic diagram of rolling phase differences t1, t2, t3, and t4 of the present disclosure.

When in use, a finger touches the leather ring 16 on the shaft sleeve 10, and the shaft sleeve 10 is rotated by the friction force between the finger and the leather ring 16. As the shaft sleeve 10 is connected with the magnetic outer shaft 8 by the limit rubber ring 15, and the metal shaft 5 and the magnetic inner shaft 6 are integrally molded, the shaft sleeve 10 will drive the magnetic outer shaft 8 to rotate synchronously, and the light holes 25 on the magnetic outer shaft 8 rotates with the magnetic outer shaft 8. The optical signals emitted by the optical transmitter 24 in the optical sensing assembly, are transferred into the optical receiver 23 through the light holes 25, so that the rotation of the shaft sleeve 10 can be judged by detecting the spaced optical signals. The quantity of both first magnetic teeth 7 and the second magnetic teeth 9 is 24. Each rotation is 24 grids, each grid has a paragraph sense, each grid corresponds to an optical signal, and each rotation sends 24 optical signals, so as to browse the web page. The quantity of the light holes 25 is 12. The light holes 25 can be rotated by the rotation of the magnetic outer shaft 8, so as to realize an on-off of the optical signals between the optical receiver 23 and the optical transmitter 24, so as to realize the output of pulse voltage. One pulse with a half-wave period is output for each rotation of one grid, and there are 24 half-wave pulses for one rotation of 360°. A list of output signals is shown in FIG. 9, and the rolling phase differences t1, t2, t3, and t4 are greater than 10 ms, as shown in FIG. 9.

Both the magnetic inner shaft 6 and the magnetic outer shaft 8 are magnetic. The first magnetic teeth 7 on the magnetic inner shaft 6 are raised in a direction of the magnetic outer shaft 8, and the second magnetic teeth 9 on the inner wall of the magnetic outer shaft 8 are raised in a direction of the magnetic inner shaft 6. Both first magnetic teeth 7 and second magnetic teeth 9 are uniform array arranged and arranged one-to-one correspondence of natural state. In the process of the shaft sleeve 10 drives the magnetic outer shaft 8 to rotate, when the first magnetic teeth 7 and the second magnetic teeth 9 correspond to each other, an attraction between the two is the strongest; when the first magnetic teeth 7 and the second magnetic teeth 9 are staggering, the attraction is gradually weakened, and then the attraction is gradually strengthened again. Thus, a paragraph sense is generated when in use. The quantity of both the first magnetic teeth 7 and the second magnetic teeth 9 is 24. Each rotation has 24 grids, each grid has a paragraph sense, each grid corresponds to an optical signal, and each rotation sends 24 optical signals, so as to browse the web page on the computer.

When the shaft sleeve 10 is forced to rotate rapidly, the external force overcomes the attraction between the first magnetic teeth 7 and the second magnetic teeth 9, and under the action of inertia, the shaft sleeve 10 continues to rotate; Furthermore, the attraction between the first magnetic teeth 7 and the second magnetic teeth 9 assists the shaft sleeve 10 to continue to rotate after losing the external force, so that the shaft sleeve 10 can drive the magnetic outer shaft 8 to rotate continuously to realize top-speed function and browse the web pages quickly and conveniently. Finally, under the action of resistance and the attraction between the first magnetic teeth 7 and the second magnetic teeth 9, the magnetic outer shaft 8 stops rotating, and the first magnetic teeth 7 and the second magnetic teeth 9 correspond to each other one by one.

A ring groove is arranged on the bracket 4, and a support corresponding to the ring groove is arranged on a mouse shell (not shown in drawings). The bracket 4 swings when rotating the shaft sleeve 10 around a joint of the support and the ring groove by external force, so that the left swing button 20 or the right swing button 21 can be pressed by the pressing portion 22 integrally formed on the surface of the bracket 4, and if the external force is a vertical force, the bracket 4 moves downwards vertically, so that the pressing portion 22 would not press the left swing button 20 or the right swing button 21, and only the middle button 2 can be pressed, false trigger of the middle button 2, the left swing button 20 and the right swing button 21 is eliminated, thereby realizing multi-functions, making the mouse more functional and being convenient to be applied to different scenarios.

Figure 13:
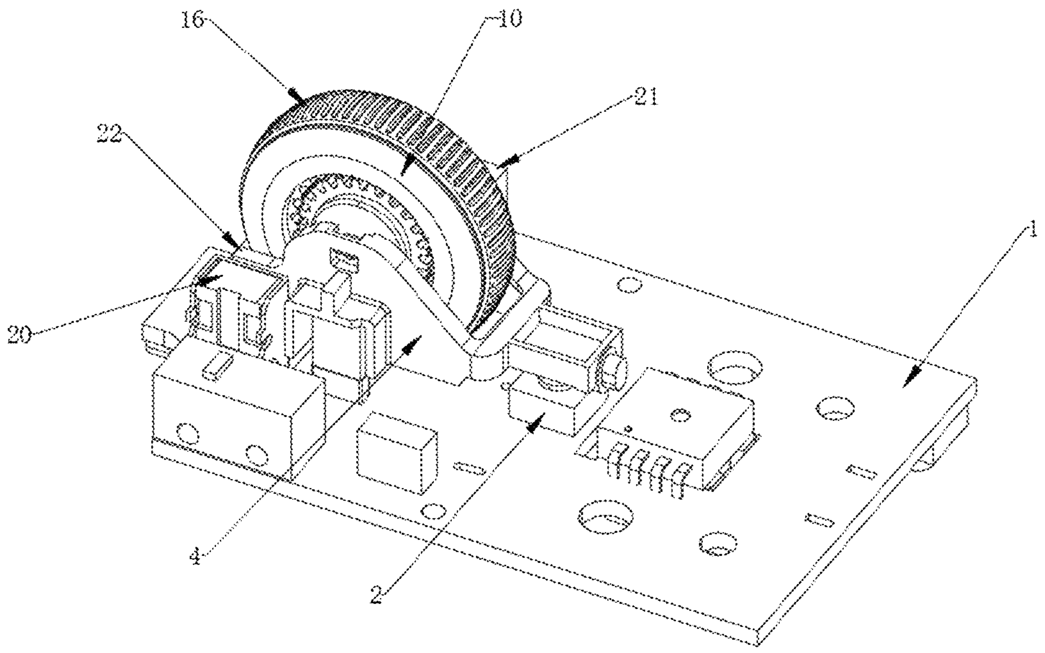
FIG. 13 is a schematic structural diagram of another implementation of the present disclosure.
Figure 14:
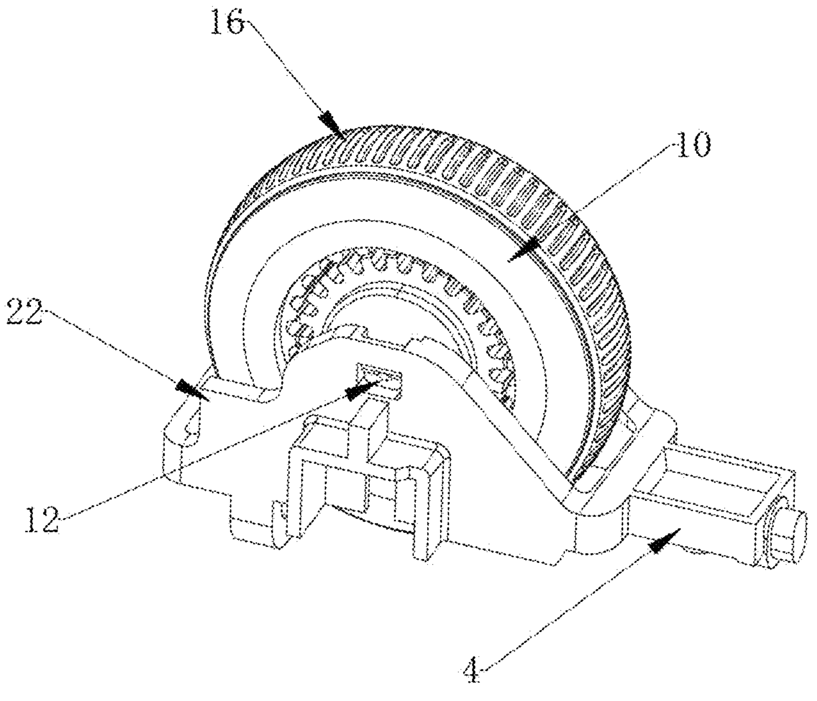
FIG. 14 is a schematic structural diagram of a pressing portion of another implementation of the present disclosure.

As shown in FIG. 13 and FIG. 14, in another implementation, the magnetic damping top-speed optical wheel includes a PCBA board 1 and a middle button 2 arranged on the PCBA board 1. A bracket 4 is arranged on the PCBA board 1 directly, and an optical sensing assembly electrically connected to the PCBA board 1 is arranged inside the bracket 4. Other arrangement is the same as the magnetic damping top-speed optical wheel as described above. In the present implementation, the bracket 4 is arranged on the PCBA board 1 directly through a clamping structure on both sides of the bracket 4 and the main board on the PCBA board 1, and no extra PCB board is needed to form the connection between the bracket 4 and the PCBA board 1. Therefore, the structure of the magnetic damping top-speed optical wheel is more compact, the requirement of space is reduced, and the miniaturization requirements of the mouse is met.

In summary, by arranging the pressing portion 22 and the shaft sleeve 10, the magnetic damping top-speed optical wheel of the present disclosure solves the problem that the mechanical encoder is too mechanical and not smooth enough to affect the hand feeling. By arranging the pressing portion 22 being parallel to the left swing button 20 and the right swing button 21, the present disclosure solves the problem that pressing the wheel could not trigger the middle button, the left swing button and the right swing button correctly.

It should be noted that in the present disclosure, relational terms such as first and second are only used to distinguish one entity or operation from another entity or operation, and do not necessarily require or imply that there is any such actual relationship or order between these entities or operations. Furthermore, the terms “including”, “comprising” or any other variation thereof are intended to cover non-exclusive inclusion, so that a process, method, article or equipment including a series of elements includes not only those elements, but also other elements not explicitly listed or elements inherent to such process, method, article or equipment.

The above optimized mentioned embodiments are just used for better understanding of the technical schemes. The above optimized mentioned do not detail all the details, nor limit the present disclosure to the particular embodiments. Obviously, many modifications and changes can be made according to the present disclosure. The embodiments are selected and described in detail in this specification in order to better explain the principle and practical application of the present disclosure, so that those skilled in the prior art can better understand and utilize the present disclosure. The present disclosure is limited only by the claims and their full scope and equivalents.

What is claimed is:

1. A magnetic damping top-speed optical wheel, comprising: a PCBA board and a middle button arranged on the PCBA board, wherein a bracket is arranged on a surface of the PCBA board through a PCB board, and an optical sensing assembly connected to the PCBA board is arranged inside the bracket;

an upper portion of the PCBA board is electrically connected with a left swing button and a right swing button; a pressing portion is integrally formed on a surface of the bracket; the pressing portion is arranged between the left swing button and the right swing button, wherein the left swing button and the right swing button are spaced apart from each other with the pressing portion interposed therebetween, and the pressing portion is parallel to the left swing button and the right swing button, wherein a magnetic inner shaft is arranged inside the bracket by a metal shaft, a uniform array of first magnetic teeth is arranged on a surface of the magnetic inner shaft, a magnetic outer shaft is nested to the surface of the magnetic inner shaft, second magnetic teeth corresponding to the first magnetic teeth are arranged inside the magnetic outer shaft, and a shaft sleeve is arranged on a surface of the magnetic outer shaft.

2. The magnetic damping top-speed optical wheel according to claim 1, wherein one end of the metal shaft is inserted into an inner side wall of the bracket for connection; the metal shaft and the magnetic inner shaft are integral injection molding; a fixture block is integrally formed on one side of the magnetic inner shaft; a fixture slot is arranged on the surface of the bracket; and a surface of the fixture block is movably connected to an interior side of the fixture slot.

3. The magnetic damping top-speed optical wheel according to claim 1, wherein an inner wall of the shaft sleeve is symmetrically arranged with limit blocks; the surface of the magnetic outer shaft is symmetrical arranged with two groups of limit portions; the limit portion comprises two limit pieces; the two limit pieces of each group are respectively movably connected to two of the limit blocks; a limit rubber ring is arranged between the magnetic outer shaft and the shaft sleeve; and a leather ring is arranged on a surface of the shaft sleeve.

4. The magnetic damping top-speed optical wheel according to claim 3, wherein an inner side wall of a surface of the limit rubber ring is connected with the surface of the magnetic outer shaft; an outer side wall of the limit rubber ring is connected with an inner side wall of the shaft sleeve; the surface of the limit rubber ring is arranged with a slot opening; and an inner side wall of the slot opening is movably connected with a surface of the limit blocks.

5. The magnetic damping top-speed optical wheel according to claim 4, wherein a limit groove is arranged on the surface of the shaft sleeve; a fixed portion is arranged integrally on the surface of the limit rubber ring; and a surface of the fixed portion is movably connected with an inner side wall of the limit groove.

6. The magnetic damping top-speed optical wheel according to claim 1, wherein the optical sensing assembly comprises an optical receiver and an optical transmitter; both the optical receiver and the optical transmitter are arranged inside the bracket; and a uniform array of light holes is arranged on the surface of a magnetic outer shaft.

7. The magnetic damping top-speed optical wheel according to claim 1, wherein a uniform array of light holes is arranged on the surface of the magnetic outer shaft, and each light hole corresponds to a notch of the second magnetic teeth.

8. The magnetic damping top-speed optical wheel according to claim 7, wherein a number ratio between the light holes and the notches of the second magnetic teeth is 1:2, and an interval between every two light holes corresponds to one notch of the second magnetic teeth.

9. A magnetic damping top-speed optical wheel comprising: a PCBA board and a middle button arranged on the PCBA board, wherein a bracket is arranged on a surface of the PCBA board directly, and an optical sensing assembly connected to the PCBA board is arranged inside the bracket;

an upper portion of the PCBA board is electrically connected with a left swing button and a right swing button; a pressing portion is integrally formed on a surface of the bracket; and the pressing portion is arranged between the left swing button and the right swing button, wherein the left swing button and the right swing button are spaced apart from each other with the pressing portion interposed therebetween, and the pressing portion is parallel to the left swing button and the right swing button, wherein a magnetic inner shaft is arranged inside the bracket by a metal shaft, a uniform array of first magnetic teeth is arranged on a surface of the magnetic inner shaft, a magnetic outer shaft is nested to the surface of the magnetic inner shaft, second magnetic teeth corresponding to the first magnetic teeth are arranged inside the magnetic outer shaft, and a shaft sleeve is arranged on a surface of the magnetic outer shaft.

10. The magnetic damping top-speed optical wheel according to claim 9, wherein one end of the metal shaft is inserted into an inner side wall of the bracket for connection; the metal shaft and the magnetic inner shaft are integral injection molding; a fixture block is integrally formed on one side of the magnetic inner shaft; a fixture slot is arranged on the surface of the bracket; a surface of the fixture block is movably connected to an interior side of the fixture slot.

11. The magnetic damping top-speed optical wheel according to claim 9, wherein an inner wall of the shaft sleeve is symmetrically arranged with limit blocks; the surface of the magnetic outer shaft is symmetrical arrangement with two groups of limit portions; each limit portion comprises two limit pieces; the two limit pieces of each group are respectively movably connected to two of the limit blocks; a limit rubber ring is arranged between the magnetic outer shaft and the shaft sleeve; and a leather ring is arranged on a surface of the shaft sleeve.

12. The magnetic damping top-speed optical wheel according to claim 11, wherein an inner side wall of a surface of the limit rubber ring is connected with the surface of the magnetic outer shaft; an outer side wall of the limit rubber ring is connected with an inner side wall of the shaft sleeve; the surface of the limit rubber ring is arranged with a slot opening; and an inner side wall of the slot opening is movably connected with a surface of the limit blocks.

13. The magnetic damping top-speed optical wheel according to claim 12, wherein a limit groove is arranged on the surface of the shaft sleeve; a fixed portion is arranged integrally on the surface of the limit rubber ring; a surface of the fixed portion is movably connected with an inner side wall of the limit groove.

14. The magnetic damping top-speed optical wheel according to claim 9, wherein the optical sensing assembly comprises an optical receiver and an optical transmitter; both the optical receiver and the optical transmitter are arranged inside the bracket; and a uniform array of light holes is arranged on the surface of a magnetic outer shaft.

15. The magnetic damping top-speed optical wheel according to claim 9, wherein a uniform array of light holes is arranged on the surface of the magnetic outer shaft, and each light hole corresponds to a notch of the second magnetic teeth.

16. The magnetic damping top-speed optical wheel according to claim 15, wherein a number ratio between the light holes and the notches of the second magnetic teeth is 1:2, and an interval between every two light holes corresponds to one notch of the second magnetic teeth.

* * * * *